US012049971B2

(12) United States Patent
Treichel

(10) Patent No.: US 12,049,971 B2
(45) Date of Patent: Jul. 30, 2024

(54) FITTING, A METHOD FOR CONNECTING CORRUGATED TUBING TO A FITTING AND USE OF A FITTING

(71) Applicant: Omega Flex, Inc., Middletown, CT (US)

(72) Inventor: Steven A. Treichel, West Chester, PA (US)

(73) Assignee: OMEGA FLEX, INC., Middletown, CT (US)

( * ) Notice: Subject to any disclaimer, the term of this patent is extended or adjusted under 35 U.S.C. 154(b) by 0 days.

(21) Appl. No.: 15/523,881

(22) PCT Filed: Oct. 21, 2015

(86) PCT No.: PCT/US2015/056578
§ 371 (c)(1),
(2) Date: May 2, 2017

(87) PCT Pub. No.: WO2016/073196
PCT Pub. Date: May 12, 2016

(65) Prior Publication Data
US 2018/0003322 A1   Jan. 4, 2018

(30) Foreign Application Priority Data
Nov. 3, 2014  (EP) .................................... 14191471

(51) Int. Cl.
*F16L 25/00* (2006.01)
*F16L 19/02* (2006.01)
*F16L 19/028* (2006.01)

(52) U.S. Cl.
CPC ....... *F16L 25/0036* (2013.01); *F16L 19/0212* (2013.01); *F16L 19/0286* (2013.01); *F16L 25/0054* (2013.01)

(58) Field of Classification Search
CPC ............... F16L 25/0036; F16L 19/0212; F16L 19/0286; F16L 25/0054; F16L 19/0206;
(Continued)

(56) References Cited

U.S. PATENT DOCUMENTS 4,437,691 A  *  3/1984  Laney ................. F16L 25/0036
                                                     285/354
6,173,995 B1 *  1/2001  Mau ..................... F16L 25/0036
                                                     285/334.5

(Continued)

FOREIGN PATENT DOCUMENTS

AU       2015343590 B2     5/2016
CN         1236423 A       11/1999
(Continued)

OTHER PUBLICATIONS

European Search Report for EP 14191471, issued Jan. 23, 2015, 6pgs.
(Continued)

*Primary Examiner* — William S. Choi
(74) *Attorney, Agent, or Firm* — CANTOR COLBURN LLP

(57) ABSTRACT

Disclosed is a fitting (1) for use with corrugated tubing (2) having a series of peaks (3) and valleys (4). The fitting (1) comprises a nut (5) having a passage (6) therethrough for receiving the tubing (2) and at least one retainer (7) arranged in the nut (5), wherein the retainer (7) has a retainer sealing surface (8) for placement in a valley (4) of the corrugated tubing (2). The fitting (1) further comprises a body (9) having a pointy annular body sealing edge (10) arranged so that the apex (11) of the body sealing edge (10) is pressed against the retainer sealing surface (8) when the nut (5) and the body (9) are forced toward each other. A method for connecting corrugated tubing (2) to a fitting (1) comprising
(Continued)

Figure 1:
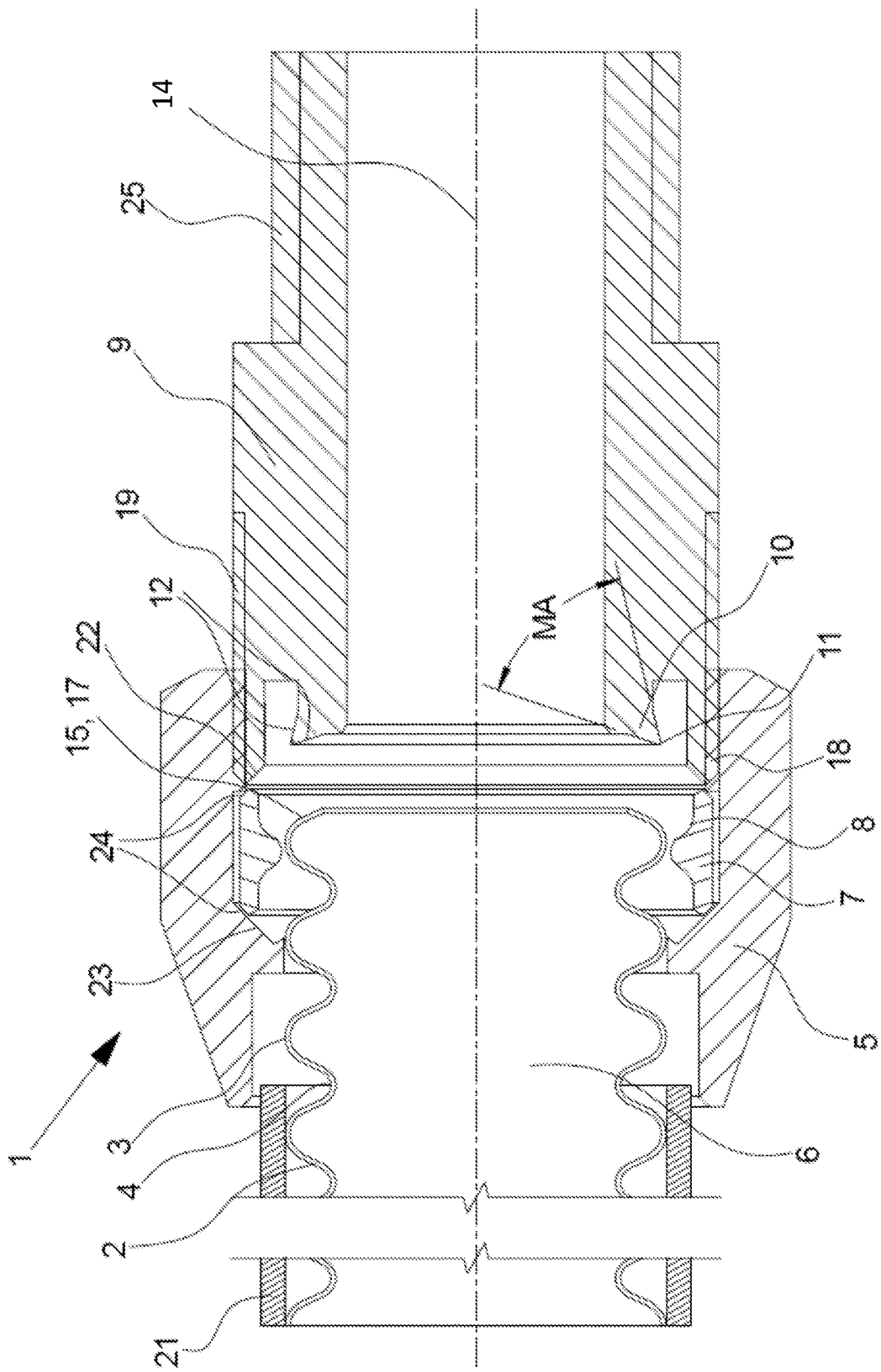

a nut (5), a retainer (7) and a body (9) and use of a fitting (1) is also disclosed.

16 Claims, 3 Drawing Sheets

(58) Field of Classification Search
 CPC .......... F16L 27/0857; F16L 9/06; F16L 11/11; F16L 25/0063; F16L 51/02
 USPC ............... 285/80, 226, 227, 299, 145.5, 903
 See application file for complete search history.

(56) References Cited

U.S. PATENT DOCUMENTS

| | | | |
|---|---|---|---|
| 7,306,264 B2 | 12/2007 | Goddard et al. | |
| 2004/0155463 A1* | 8/2004 | Moner | F16L 25/0036 285/322 |
| 2005/0023832 A1 | 2/2005 | Edler | |
| 2006/0006651 A1* | 1/2006 | Watanabe | F16L 25/0036 285/903 |
| 2007/0018450 A1* | 1/2007 | Golafshani | F16L 25/0036 285/23 |
| 2008/0012300 A1* | 1/2008 | Duquette | F16L 25/0036 285/247 |
| 2010/0052317 A1 | 3/2010 | Mezzalira | |
| 2013/0082461 A1 | 4/2013 | Hunter | |

FOREIGN PATENT DOCUMENTS

| | | | |
|---|---|---|---|
| CN | 101449095 A | 6/2009 | |
| EP | 2278204 A2 | 1/2011 | |
| EP | 1769184 B1 | 4/2012 | |
| EP | 2278204 B1 * | 11/2012 | .......... F16L 25/0036 |
| SU | 45144 A1 | 11/1935 | |
| WO | 2004072535 A1 | 8/2004 | |
| WO | 2006004720 A2 | 1/2006 | |

OTHER PUBLICATIONS

International Search Report and Written Opinion for application PCT/US2015/056578, Issued Dec. 29, 2015, 12pgs.
Chinese First Office Action and Search Report for application 201580058636.4, dated Aug. 14, 2018, 6 pages.
Argentinian Office Action for 20150103541, Issued Aug. 8, 2020; 3 Pages.

* cited by examiner

FITTING, A METHOD FOR CONNECTING CORRUGATED TUBING TO A FITTING AND USE OF A FITTING

FIELD OF THE INVENTION

The invention relates to a fitting for use with corrugated tubing having a series of peaks and valleys. The invention also relates to a method for connecting corrugated tubing to a fitting comprising a nut, a retainer and a body and to use of a fitting.

BACKGROUND OF THE INVENTION

The flexible gas piping (FGP) system, also referred to as corrugated stainless steel tubing (CSST) and formerly Interior Gas Piping (IGP) was developed in Japan and first introduced into that market by Osaka Gas and Tokyo Gas Companies during the early 1980's. The system utilizes stainless steel corrugated tubing supplied in rolls or coils with field attachable fittings to distribute gas from a central supply point such as the meter or regulator to the various appliances within a house or building. The technology, which has likened the process of plumbing a house for gas to wiring a house for electricity, substantially reduces installation time and hence the associated higher cost of labor.

However, the FGP system requires that the corrugated tubing can be easily and safely connected to gas devices such as gas meters, gas consuming devices, gas supplying devices and other.

Thus, from EP 1 769 184 B1 it is known to provide the corrugated tube with a threaded fitting suited for forming a simple and safe connected to such devices. From EP 1 769 184 B1 it is known to form a metal to metal flange seal between the corrugated tube and the fitting by compressing a part of the end of the corrugated tube between a flat radial extending sealing surface of a nut and a corresponding flat radial extending sealing surface of a body. Both these sealing surfaces are extending perpendicular from a center axis through the fitting. However, this fitting design entails that much force is required to ensure a tight seal.

An object of the invention is therefore to provide for an advantageous technique for forming a tight seal between corrugated tubing and a fitting.

THE INVENTION

The invention provides for a fitting for use with corrugated tubing having a series of peaks and valleys. The fitting comprises a nut having a passage therethrough for receiving the tubing and at least one retainer arranged in the nut, wherein the retainer has a retainer sealing surface for placement in a valley of the corrugated tubing. The fitting further comprises a body having a pointy annular body sealing edge arranged so that the apex of the body sealing edge is pressed against the retainer sealing surface when the nut and the body are forced toward each other.

Forming the seal by compressing a part of the corrugated tube between a retainer sealing surface and the apex of a pointy annular body sealing edge is advantageous in that the seal hereby can be formed in a narrow annular line which requires little compression force to form.

In an aspect of the invention, the pointy annular body sealing edge is formed along the edge of two abutting body surfaces, wherein the mutual angle between the surfaces is between 10° and 170°, preferably between 45° and 135° and most preferred between 60° and 120°.

If the mutual angle between the two abutting body surfaces is too acute the risk of the apex cutting into the compressed corrugated tube is increased—hereby increasing the risk of compromising the seal. However, if the mutual angle between the two abutting body surfaces is too obtuse it will require too much force to form a tight seal. Thus, the present angle ranges provides an advantageous relationship between functionality and applicability.

In an aspect of the invention, the tangent angle between the body surfaces and a tangent through the retainer sealing surface at the body sealing edge, when the fitting is sealing corrugated tubing, is between 10° and 80°, preferably between 20° and 70° and most preferred between 30° and 60°.

If the angles between the body surfaces and the tangent are too acute it will require too much force to form a tight seal. However, if the angles between the body surfaces and the tangent are too obtuse the risk of the apex cutting into the compressed corrugated tube is increased—hereby increasing the risk of compromising the seal. Thus, the present angle ranges provides an advantageous relationship between functionality and applicability.

In an aspect of the invention, one of the body surfaces is substantially perpendicular to a longitudinal centre axis of the fitting.

By forming one of the body surfaces substantially perpendicular to the longitudinal extend of the fitting (and the tube) the retainer sealing surface can be formed sloping—in relation to said longitudinal centre axis—which enables that the end of the tube can be pushed forwards while forming the seal. This will enable a smoother deformation and compression of the corrugated tube.

Furthermore, the substantially perpendicular body surface also enables a more simple manufacturing process.

Even further, it is also advantageous to ensure that the outer diameter of the compressed end of the tube does not exceed the outer diameter of the rest of the tube so that the fitting may easily be removed from the corrugated tube afterwards. It is therefore also advantageous to ensure that the outer diameter of the compressed end of the tube substantially does not exceed the outer diameter of the rest of the tube in that it hereby is possible to dismantle the fitting without damaging the tube or the fitting.

In an aspect of the invention, the retainer sealing surface is concave.

Forming the retainer sealing surface concave is advantageous in that this shape will aid in bending and compressing the end of the tube and push it forward to ensure a sufficiently small outer diameter of the compressed end.

In an aspect of the invention, the body sealing edge is arranged to press into a side of a corrugation of the corrugated tubing.

If the pointy annular body sealing edge was arranged to compress a corrugation at the top or the bottom, the risk of breaking the tube due to the shape bend is increased. Thus, it is advantageous to arrange the body sealing edge to press into a side of a corrugation of the corrugated tube.

In an aspect of the invention, the retainer is substantially symmetrical around a plane through the middle of the retainer, the plane being perpendicular to a longitudinal centre axis of the fitting.

Forming the retainer substantially symmetrical around a plane through the middle of the retainer is advantageous in that it simplifies manufacturing of the retainer and assembly of the fitting. Furthermore, the symmetrical retainer design enables that the retainer can be turned around if the side currently used has been damaged or worn—thus, prolonging the life of the fitting.

In an aspect of the invention, the pointy annular body sealing edge is arranged to form a substantially linear seal at an end of the corrugated tubing.

This is advantageous in that it requires much less force to form a linear seal than to form e.g. a flange seal as known from EP 1 769 184 B1.

In an aspect of the invention, the substantially linear seal is less than 3 mm, preferably less than 2 mm and most preferred less than 1 mm wide.

If the seal is too wide it requires more force to form the seal and the present width ranges therefore provides an advantageous limit in relation to functionality.

In an aspect of the invention, the nut is provided with internal thread adapted to fit an external thread of the body.

Providing the nut and the body with corresponding thread is advantageous in that it provides simple and efficient means for forcing the nut and the body toward each other.

In an aspect of the invention, the apex is rounded.

A sharp apex is vulnerable and a sharp apex will increase the risk of the apex cutting into the corrugated tube—thus increasing the risk of damaging the tube and breaking the seal. It is therefore advantageous to round the apex.

In an aspect of the invention, the apex is rounded at a radius of between 0.05 and 5 mm, preferably between 0.2 and 4 mm and most preferred between 0.4 and 3 mm.

If the apex is too sharp the risk of damaging the tube and breaking the seal will increase. However, if the rounding is too big, the sealing area becomes too big and the force needed to form a tight seal will increase. Thus, the present rounding ranges present an advantageous relationship between functionality and applicability.

In an aspect of the invention, said retainer is made from a flexible material and the inner diameter of the retainer is smaller than the outer diameter of the corrugated tube.

Forming the retainer with an inner diameter that is smaller than the outer diameter of the corrugated tube enables that the corrugated tube will have to be forced through the retainer and once the first peak of the corrugated tube passes through the retainer, the flexible quality of the retainer ensures that the retainer snaps inwards so that it can only be removed from the succeeding valley of the corrugated tube by force. This is advantageous in that retainer hereby stays in correct position on the corrugated tube until succeeding operations—like forcing the nut and body towards each other—is performed.

The invention also provides for a method for connecting corrugated tubing to a fitting comprising a nut, a retainer and a body. The method comprises the steps of:
- arranging one end of the corrugated tubing inside the nut containing the retainer so that a retainer sealing surface of the retainer is arranged in a valley of the corrugated tubing,
- arranging the nut on the body, wherein the body comprises a pointy annular body sealing edge,
- forcing the retainer sealing surface towards an apex of the pointy annular body sealing edge to form a seal between the fitting and the corrugated tubing by compressing a part of the corrugated tubing between the retainer sealing surface and the apex.

Connecting the corrugated tubing to the fitting by compressing an end of the tube between an apex of the pointy annular body sealing edge and the retainer sealing surface is advantageous is that this is a simple and efficient way of forming a tight seal between the fitting and the tube.

In an aspect of the invention, the retainer sealing surface and the apex are forced towards each other by tightening a threaded connection between the nut and the body.

Forcing two parts towards each other by tightening a threaded connection between the parts provides for a simple and efficient way for compressing the tube with a large force to form a tight seal.

In an aspect of the invention, the method is a method for connecting corrugated tubing to a fitting according to any of the previously mentioned fittings.

Furthermore, the invention provides for use of a fitting according to any of the previously mentioned fittings for forming a metal to metal seal at one end of corrugated tubing.

Using a fitting according to the present invention for forming a seal between the fitting and a corrugated tube is advantageous in that the retainer design and the shape of the body sealing edge ensures an efficient and tight metal to metal seal.

FIGURES

Figure 2:
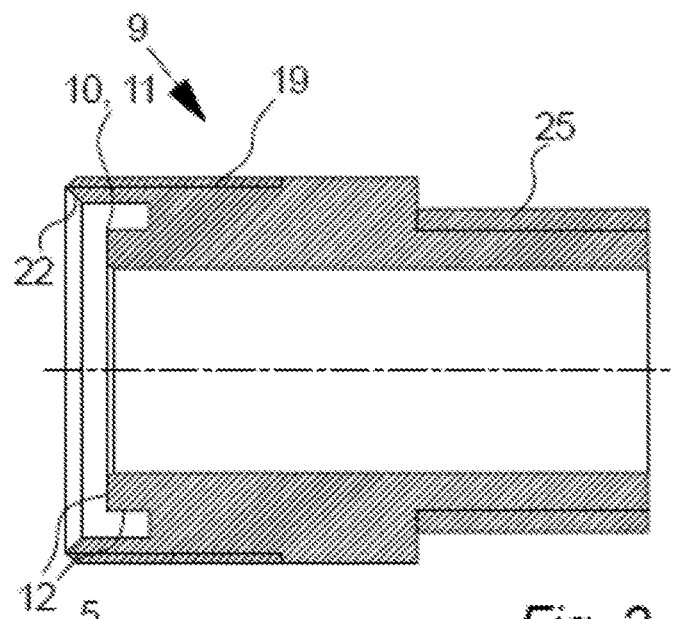
Figure 3:
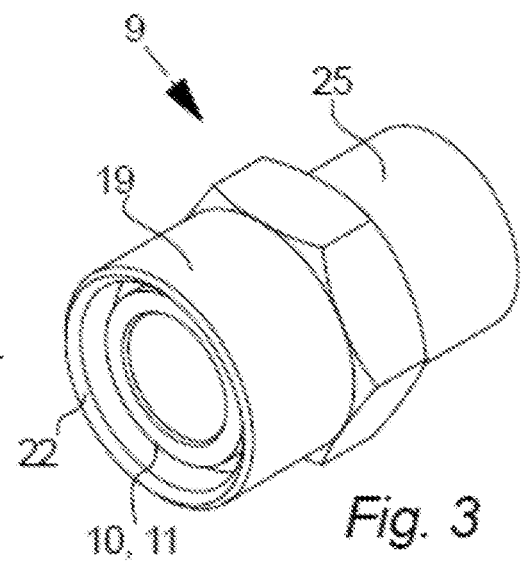
Figure 4:
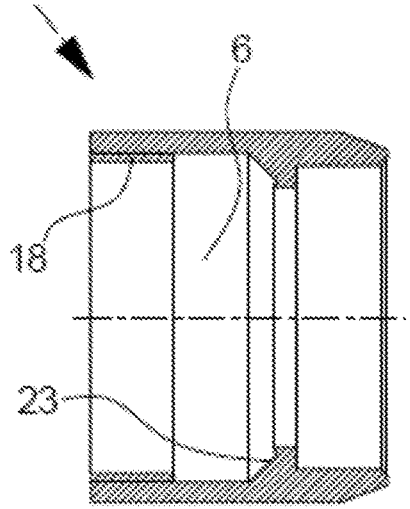
Figure 5:
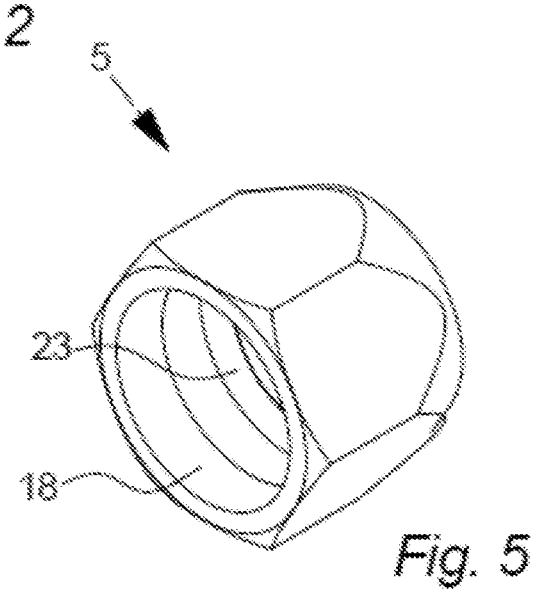
Figure 6:
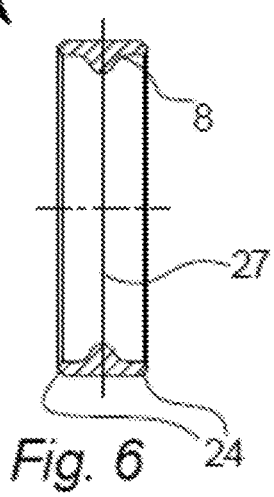
Figure 7:
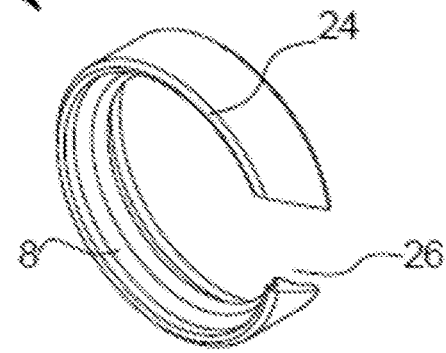
Figure 8:
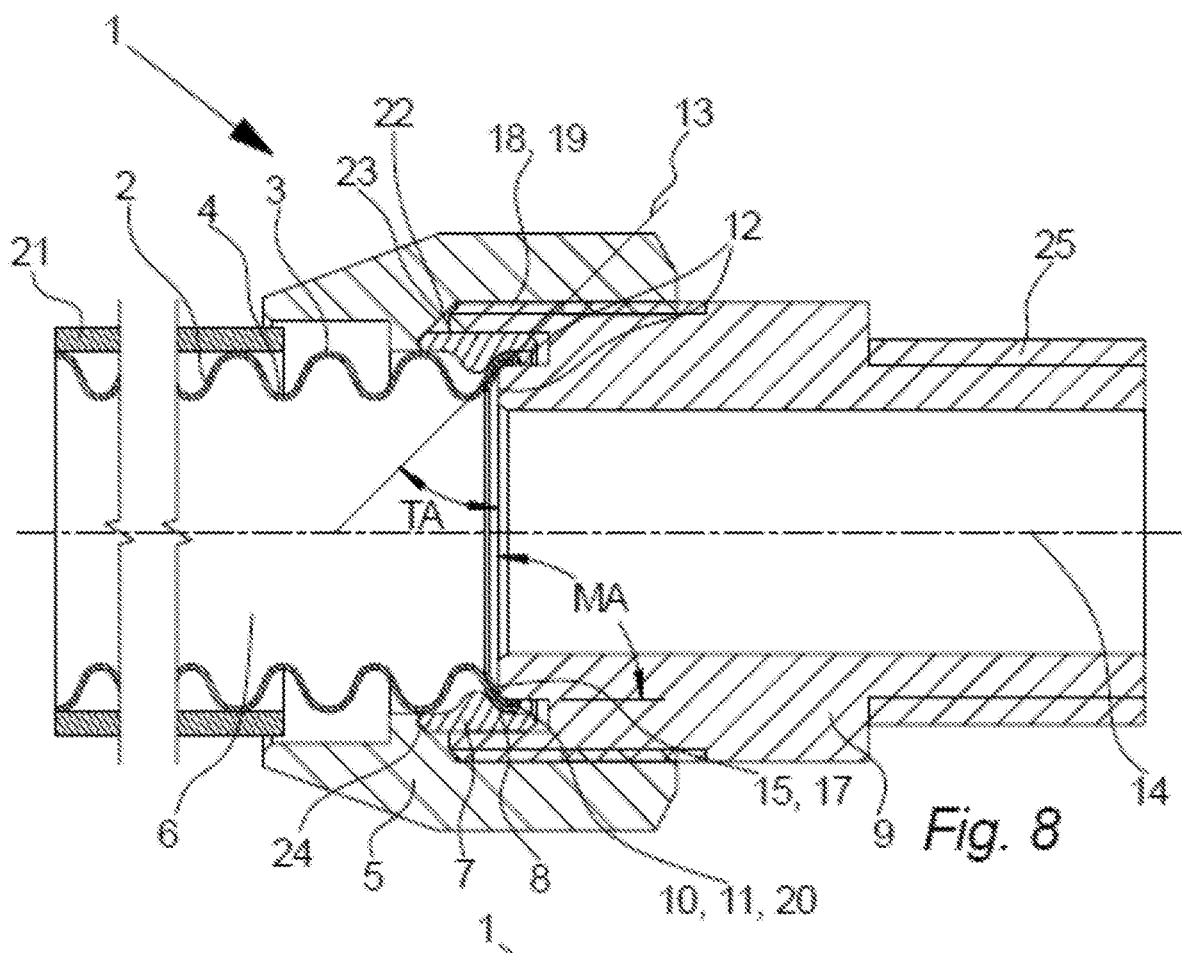
Figure 9:
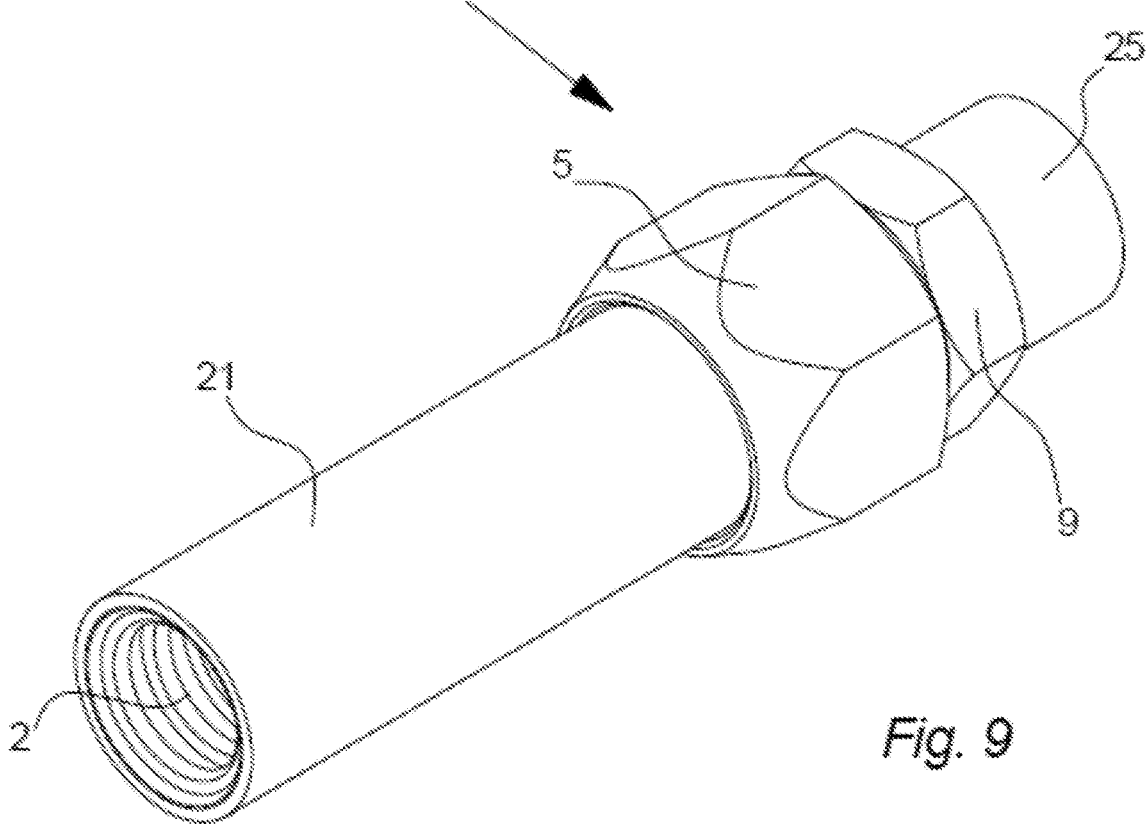

The invention will be described in the following with reference to the figures in which FIG. 1 illustrates a cross section through the middle of a fitting according to the invention before a seal has been formed, as seen from the side, FIG. 2 illustrates a cross section through the middle of a body, as seen from the side, FIG. 3 illustrates a body, as seen in perspective, FIG. 4 illustrates a cross section through the middle of a nut, as seen from the side, FIG. 5 illustrates a nut, as seen in perspective, FIG. 6 illustrates a cross section through the middle of a retainer, as seen from the side, FIG. 7 illustrates a retainer, as seen in perspective, FIG. 8 illustrates a cross section through the middle of a closed fitting, as seen from the side, and FIG. 9 illustrates a closed fitting, as seen in perspective.

DETAILED DESCRIPTION

FIG. 1 illustrates a cross section through the middle of a fitting 1 according to the invention before a seal 20 has been formed, as seen from the side.

In this embodiment a corrugated tube 2 is being arranged in the fitting 1 but is has not yet been pushed all the way into the fitting 1 so that the end 17 of the tube 2 is pushed against a body surface 12 of the body 9.

Typically the retainer 7 is arranged in the nut 5 and the nut 5 is mounted on the body 9 when the fitting 1 is supplied to the user. In this embodiment the inner diameter of the retainer 7 is slightly smaller than the outer diameter of the peaks 3 of the corrugated tube 2 so that when the user mounts the fitting 1 on a corrugated tube 2 the user simply places the tube 2 into the passage 6 through the nut 5 and pushes it forward so that the first peak 6 on the corrugated tube 2 will engage the retainer protrusion 28 of the retainer 7 and push the retainer 7 outwards. As the corrugated tube 2 moves forward the retainer 7 snaps into place in the valley 4 succeeding the first peak 3. Hereby it is ensured that the fitting stays in place on the corrugated tube 2 during succeeding operations (to be explained in the following).

However, in another embodiment the inner diameter of the retainer 7 could by default formed so big that it would be bigger than the outer diameter of the corrugated tube 2 and so that the corrugated tube 2 easily may be passed through the retainer 7 arranged in the nut 5 (see also FIG. 7).

Also, in another embodiment the corrugated tube 2 could first be passed through the nut 5—and the retainer 7—before the nut 5 would be mounted on the body 9.

Once the corrugated tube 2 is positioned correctly inside the fitting 1 the body 9 and the nut 5 are forced towards each other whereby the geometry of the body 9 and the nut 5 will force the retainer 7 inwards—thus reducing the diameter of the retainer 7. In this embodiment this geometry of the body 9 and the nut 5 includes a sloping front surface 22 of the body 9 and a sloping retainer surface 23 of the nut 5 arranged to engage matching sloping side surfaces 24 on the retainer 7 so that when the front surface 22 and the retainer surface 23 are forced towards each other, they will engage the side surfaces 24 of the retainer 7 and push the retainer 7 inwards to reduce its diameter and force the retainer 7 into a valley 4 of the corrugated tube 2.

As explained above forming the retainer 7 with a slightly smaller inner diameter than the outer diameter of the corrugated tube 2 ensures that the retainer protrusion 28 of the retainer 7 protrudes into a valley 4 of the corrugated tube 2 and ensures that the retainer remains correctly placed in relation to the peaks 3 and valleys 4 of the corrugated tube 2 while a user e.g. finds and mounts fitting tools to perform the action of forcing body 9 and the nut 5 towards each other.

However, in another embodiment only the nut 5 or only the body 9 would be provided with a sloping surface forcing the retainer 7 inwards or the retainer 7 would be forced inwards by other means e.g. arranged outside the retainer 7 so that these other means would impact on the retainer 7.

In this embodiment the nut 5 is provided with internal thread 18 matching the external thread 19 of the body 9 so that when one of these parts 5, 9 is rotated in relation to the other the meshing thread 18, 19 will force the parts 5, 9 towards or away from each other depending of the direction of rotation.

However, in another embodiment the body 9 could be provided with internal thread matching external thread on the nut 5, one or both of the nut 5 and the body 9 could be provided with a clamping device capable of forcing the parts 5, 9 together around the end 17 of the corrugated tubing 2 to form a tight seal 20 or the nut 5 and the body 9 could be designed to be forced together—and locked in a closed position—by means of an external tool or device.

As previously explained the fitting 1 is in this embodiment shown in an open state but when the corrugated tubing 2 is arranged against the body 9 and the nut 5 and the body 9 are forced towards each other, the retainer 7 will force the last corrugation of the corrugated tubing 2 forward so that it is pressed against the apex 11 of a pointy annular body sealing edge 10 formed at the end of the body 9 so that a tight seal 20 can be formed between the corrugated tubing 2 and the fitting 1.

In this embodiment the pointy annular body sealing edge 10 is formed along the edge of two abutting body surfaces 12 having a mutual angle MA of approximately 60° but in another embodiment the mutual angle MA could be both larger or smaller such as 80°, 90°, 100° or other.

In this embodiment the body surface 12 closest to the centre of the fitting 1 is arranged in an angle of approximately 70° in relation to the centre axis 14, but in another embodiment this body surface 12 could be arranged in an angle of 60°, 80°, 100° or other or this body surface 12 could be arranged substantially perpendicular to the longitudinal centre axis 14 of said fitting 1 as disclosed in FIGS. 2 and 8.

In this embodiment the apex 11 of the pointy annular body sealing edge 10 is rounded to prevent the apex 11 from cutting into the corrugated tubing 2 and potentially compromise the seal 20 and to increase the durability of the apex 11. However, in another embodiment the apex 11 could be rounded more e.g. if the mutual angle MA of the body surfaces 12 was smaller or the apex 11 could be rounded less or not at all e.g. if the mutual angle MA was larger.

In this embodiment the nut 5, the retainer 7 and the body 9 are all made from machined brass but in another embodiment one or more of these parts 5, 7, 9 could at least partly be made by casting and/or one or more of these parts 5, 7, 9 could be made from another metal such as steel, stainless steel, copper or other or they could be made from another material such as plastic, Polyoxymethylene (POM), fiber reinforced resin, some sort of composite material or any combination thereof.

In this embodiment the corrugated tubing 2 is a corrugated stainless steel tubing (CSST) but in another embodiment the corrugated tubing 2 could be made from another material such as copper, aluminum, some sort of alloy or it could be made from another material such as plastic, Polyoxymethylene (POM), some sort of composite material or any combination thereof In this embodiment the corrugated tubing 2 is provided with a jacket 21 in the form of a rubber hose enclosing the corrugated tubing 2 but in another embodiment the jacket could be formed by another material such as a composite material, a foam material, a fiber reinforced material or other or in another embodiment the jacket 21 would be formed integrally with the corrugated tubing 2 or the corrugated tubing 2 would not be provided with a jacket 21.

FIG. 2 illustrates a cross section through the middle of a body 9, as seen from the side and FIG. 3 illustrates a body 9, as seen in perspective.

In this embodiment a central part of the body 9 is formed hexagonally enabling that the body 9 may be rotated by means of some kind of spanner while being connected to the nut 5.

As previously discussed in this embodiment one end of the body 5 is provided with external thread 19 enabling that the body 9 may be screwed into the nut 5. However, in this embodiment the other end of the body 9 is also provided with a standardized utility external thread 25 enabling that corrugated tubing 2 provided with a fitting 1 may be connected to further devices provided with a matching standardized connector. In this embodiment the utility external thread 25 is ½" but corrugated tubing 2, the fitting and particularly the utility external thread 25 could obviously be made either larger or smaller to e.g. fit a specific use.

FIG. 4 illustrates a cross section through the middle of a nut 5, as seen from the side and FIG. 5 illustrates a nut 5, as seen in perspective.

In this embodiment the outside of the nut 5 is formed hexagonally enabling that the nut 5 may be rotated by means of some kind of spanner while being connected to the body 9.

FIG. 6 illustrates a cross section through the middle of a retainer 7, as seen from the side and FIG. 7 illustrates a retainer 7, as seen in perspective.

As previously discussed the retainer 7 is forced inwards so that the diameter of the retainer 7 is reduced when the nut 5 and the body 9 are forced towards each other and the diameter of the retainer 7 is increased when the corrugated tube 2 is pushed through the retainer 7. To allow this diameter variation of the retainer 7, the retainer 7 is by default provided with a wide slit 26. The width of this slit 26 will gradually change as the diameter of the retainer 7 is changed. To allow that the retainer 7 snaps back to its original diameter when the corrugated tube 2 is pushed through the retainer 7 the retainer is in this embodiment made from brass which is sufficiently flexible to allow this functionality.

In this embodiment the retainer 7 is initially formed so that the width of the slit 26 is substantially zero when the fitting 1 is fully closed—thus enabling that the retainer 7 will press all the way around the end 17 of the corrugated tubing 2. However, it is obvious to the skilled person that a tight seal 20 can also be achieved even if the retainer 7 is not pressing all the way around the end 17 of the corrugated tubing 2.

In this embodiment the retainer 7 is substantially symmetrical around a plane 16 through the middle of the retainer 7, wherein this plane 16 is perpendicular to the centre axis 27 of the retainer 7 and thus also to the longitudinal centre axis 14 of the fitting 1 when the retainer 7 is in use in the fitting 1. However, in another embodiment the retainer 7 could be formed asymmetrically.

FIG. 8 illustrates a cross section through the middle of a closed fitting 1, as seen from the side and FIG. 9 illustrates a closed fitting 1, as seen in perspective.

In this embodiment the end 17 of the corrugated tubing 2 is completely compressed between the apex 11 of the body sealing edge 10 and the retainer sealing surface 8 of the retainer 7. As the nut 5 and body 9 are forced together and the diameter of the retainer 7 is reduced the retainer 7 will extend down into the valley 4 laying in front and the retainer sealing surface 8 will push at least the last corrugation of the corrugated tubing 2 forwards and against the apex 11 of the body sealing edge 10 so that this corrugation is deformed and compressed between the apex 11 of the body sealing edge 10 and the retainer sealing surface 8.

In this embodiment the retainer sealing surface 8 is concave but in another embodiment the sealing surface 8 could be formed convex, flat or it could be formed with a more complex surface contour.

In this embodiment the tangent angle TA between said body surfaces 12 and a tangent 13 through the retainer sealing surface 8 at the centre point where the body sealing edge 10 engages the corrugated tubing 2—i.e. at the apex 11—is around 45° and in the embodiment disclosed in FIG. 1 it would be around 60° but this angle TA could obviously be both larger or smaller e.g. depending in the specific design of the retainer sealing surface 8, the body sealing edge 10 or other.

In this embodiment the body sealing edge 10 is arranged to press into the side 15 of the corrugation at the end 17 of the corrugated tubing 2 but in another embodiment the body sealing edge 10 could be arranged to press at the peak 3 or at the bottom of the valley 4 of this corrugation.

The pointy design of the body sealing edge 10 entails that a substantially linear annular seal 20 is formed along the annular apex 11 of the body sealing edge 10 at the end 17 of the corrugated tubing 2.

In this embodiment this seal is around 2 mm wide but in another embodiment the seal 20 could be wider or narrower particularly depending on the specific design of the body sealing edge 10 and especially the specific design of the apex 11 of the body sealing edge 10 or e.g. depending on the specific corrugated tubing 2, the design of the retainer 7 and/or other.

The invention has been exemplified above with reference to specific examples of nuts 5, retainers 7, bodies 9 and other. However, it should be understood that the invention is not limited to the particular examples described above but may be designed and altered in a multitude of varieties within the scope of the invention as specified in the claims.

LIST

1. Fitting
2. Corrugated tubing
3. Peak of corrugated tubing
4. Valley of corrugated tubing
5. Nut
6. Passage through nut
7. Retainer
8. Retainer sealing surface
9. Body
10. Body sealing edge
11. Apex of body sealing edge
12. Body surface
13. Tangent through retainer sealing surface at body sealing edge
14. Longitudinal centre axis of fitting
15. Side of corrugation of corrugated tubing
16. Plane through middle of retainer
17. End of corrugated tubing
18. Internal thread of nut
19. External thread of body
20. Seal
21. Jacket
22. Front surface of body
23. Retainer surface of nut
24. Side surface of retainer
25. Utility external thread
26. Slit
27. Centre axis of retainer
28. Retainer protrusion MA. Mutual angle between body surfaces
TA. Tangent angle between body surfaces and retainer sealing surface tangent

The invention claimed is:

1. A fitting for use with corrugated tubing having a series of peaks and valleys, said fitting comprising,
a nut having a passage therethrough for receiving said tubing,
at least one retainer arranged in said nut, said retainer having a retainer sealing surface for placement in a valley of said corrugated tubing, and a body having a pointy annular body sealing edge arranged so that the apex of said body sealing edge is pressed against said retainer sealing surface when said nut and said body are forced towards each other;
wherein said retainer is substantially symmetrical around a plane through the middle of said retainer, said plane being perpendicular to a longitudinal centre axis of said fitting;
wherein said pointy annular body sealing edge is arranged to form a line seal at an end of said corrugated tubing;
wherein said pointy annular body sealing edge is formed along the edge of two abutting body surfaces, one of said two abutting body surfaces is substantially perpendicular to a longitudinal centre axis of said fitting, wherein a mutual angle between said surfaces is between 10° and less than 90°.

2. A fitting according to claim 1, wherein a tangent through said retainer sealing surface at said body sealing edge, when said fitting is sealing corrugated tubing, is between 10° and 80°.

3. A fitting according to claim 2, wherein the tangent angle is between 20° and 70°.

4. A fitting according to claim 2, wherein the tangent angle is between 30° and 60°.

5. A fitting according to claim 1, wherein one of said body surfaces is substantially perpendicular to a longitudinal centre axis of said fitting.

6. A fitting according to claim 1, wherein said body sealing edge is arranged to press into a side of a corrugation of said corrugated tubing.

7. A fitting according to claim 1, wherein said line seal is less than 3 mm wide.

8. A fitting according to claim 1, wherein the mutual angle is between 45° and less than 90°.

9. A fitting according to claim 1, wherein the mutual angle is between 60° and less than 90°.

10. A fitting according to claim 1, wherein a second of said two abutting body surfaces is substantially parallel to a longitudinal centre axis of said fitting.

11. A fitting according to claim 1, wherein each of the two abutting body surfaces is planar in cross-section of the fitting.

12. A fitting according to claim 1, wherein the fitting is configured to carry gas.

13. A fitting according to claim 1, wherein the retainer is configured to be turned around if a side of the retainer facing the pointy annular body sealing edge has been damaged or worn.

14. A tubing system comprising:
a fitting according to claim 1; and
corrugated tubing configured to carry gas.

15. A fitting for use with corrugated tubing having a series of peaks and valleys, said fitting comprising,
a nut having a passage therethrough for receiving said tubing,
at least one retainer arranged in said nut, said retainer having a retainer sealing surface for placement in a valley of said corrugated tubing, and a body having a pointy annular body sealing edge arranged so that the apex of said body sealing edge is pressed against said retainer sealing surface when said nut and said body are forced towards each other;
wherein said retainer sealing surface is concave and curved;
wherein said retainer sealing surface is positioned opposite said pointy annular body sealing edge, said retainer sealing surface and said pointy annular body sealing edge configured to compress corrugated tubing therebetween;
wherein said pointy annular body sealing edge is arranged to form a line seal at an end of said corrugated tubing;
wherein said retainer is substantially symmetrical around a plane through the middle of said retainer, said plane being perpendicular to a longitudinal centre axis of said fitting;
wherein said line seal is less than 3 mm wide;
wherein the retainer sealing surface is curved and concave over the entire line seal;
wherein said pointy annular body sealing edge is formed along the edge of two abutting body surfaces, a first of said two abutting body surfaces is substantially perpendicular to a longitudinal centre axis of said fitting, wherein a mutual angle between said surfaces is between 10° and less than 90°.

16. A fitting according to claim 15, wherein the fitting is configured to carry gas.

* * * * *